US008839308B2

(12) United States Patent
Howcroft

(10) Patent No.: US 8,839,308 B2
(45) Date of Patent: *Sep. 16, 2014

(54) SYSTEM AND METHOD OF SCHEDULING AN EVENT RELATED TO AN ADVERTISEMENT

(75) Inventor: Jerald Robert Howcroft, Beverly Hills, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/291,151

(22) Filed: Nov. 8, 2011

(65) Prior Publication Data

US 2012/0054804 A1 Mar. 1, 2012

Related U.S. Application Data

(63) Continuation of application No. 11/640,526, filed on Dec. 15, 2006, now Pat. No. 8,079,048.

(51) Int. Cl.
*H04N 5/445* (2011.01)
*G06F 3/00* (2006.01)
*H04N 5/781* (2006.01)
*H04N 21/478* (2011.01)
*H04N 21/472* (2011.01)

(52) U.S. Cl.
CPC ........... *H04N 5/44513* (2013.01); *H04N 5/781* (2013.01); *H04N 21/478* (2013.01); *H04N 21/47214* (2013.01)
USPC ................. 725/61; 725/33; 725/58; 715/747; 715/710

(58) Field of Classification Search
CPC ................ H04N 21/47214; H04N 21/6547; H04N 21/814
USPC ...................... 725/33, 58; 715/710, 747, 810, 715/828–829
See application file for complete search history.

(56) References Cited

U.S. PATENT DOCUMENTS

| | | | |
|---|---|---|---|
| 5,640,484 A | 6/1997 | Mankovitz | |
| 5,724,475 A | 3/1998 | Kirsten | |
| 6,725,461 B1 * | 4/2004 | Dougherty et al. | 725/40 |
| 6,901,603 B2 | 5/2005 | Zeidler et al. | |
| 6,968,364 B1 | 11/2005 | Wong et al. | |
| 7,237,250 B2 | 6/2007 | Kanojia et al. | |
| 2002/0016965 A1 * | 2/2002 | Tomsen | 725/42 |
| 2002/0032907 A1 | 3/2002 | Daniels | |
| 2002/0092022 A1 | 7/2002 | Dudkicwicz et al. | |
| 2002/0157099 A1 | 10/2002 | Schrader et al. | |
| 2002/0166123 A1 | 11/2002 | Schrader et al. | |
| 2003/0012554 A1 | 1/2003 | Zeidler et al. | |
| 2003/0131354 A1 | 7/2003 | Lanser | |

(Continued)

*Primary Examiner* — Nathan J. Flynn
*Assistant Examiner* — Gigi L Dubasky
(74) *Attorney, Agent, or Firm* — Toler Law Group, PC

(57) ABSTRACT

A method includes transmitting media content to a set-top box. The media content includes an advertisement having a selectable reminder indicator related to an event. The method further includes receiving an input selection related to the selectable reminder indicator from the set-top box, sending a first menu to the set-top box including at least one option to schedule a reminder associated with the event, and sending a second menu to the set-top box in response to receiving a selection of the at least one option. The second menu includes a device menu including an option to specify a device order in which to send the reminder to a plurality of devices.

20 Claims, 13 Drawing Sheets

(56) References Cited

U.S. PATENT DOCUMENTS

| | | |
|---|---|---|
| 2003/0159150 A1 | 8/2003 | Chernock et al. |
| 2004/0040035 A1 | 2/2004 | Carlucci et al. |
| 2004/0146271 A1 | 7/2004 | Burks |
| 2004/0260749 A1* | 12/2004 | Trossen et al. ............... 709/200 |
| 2005/0055715 A1 | 3/2005 | Minnick et al. |
| 2005/0055717 A1 | 3/2005 | Daniels |
| 2005/0055730 A1 | 3/2005 | Daniels |
| 2005/0060755 A1 | 3/2005 | Daniels |
| 2005/0060756 A1 | 3/2005 | Daniels |
| 2005/0086696 A1 | 4/2005 | Daniels |
| 2005/0196139 A1 | 9/2005 | Blackketter et al. |
| 2005/0232592 A1 | 10/2005 | Kimoto et al. |
| 2005/0251750 A1 | 11/2005 | Vallone et al. |
| 2005/0267994 A1 | 12/2005 | Wong et al. |
| 2005/0273819 A1* | 12/2005 | Knudson et al. ............... 725/58 |
| 2006/0090179 A1 | 4/2006 | Hsu et al. |
| 2007/0087833 A1 | 4/2007 | Feeney et al. |
| 2007/0168228 A1 | 7/2007 | Lawless |
| 2007/0212023 A1* | 9/2007 | Whillock ............... 386/94 |
| 2008/0148320 A1 | 6/2008 | Howcroft |
| 2008/0163305 A1 | 7/2008 | Johnson et al. |
| 2008/0184313 A1 | 7/2008 | Knudson et al. |
| 2008/0189162 A1* | 8/2008 | Ganong et al. ............... 705/9 |

* cited by examiner

SYSTEM AND METHOD OF SCHEDULING AN EVENT RELATED TO AN ADVERTISEMENT

CROSS-REFERENCE TO RELATED APPLICATIONS

The present application claims priority from and is a continuation of U.S. patent application Ser. No. 11/640,526, issued as U.S. Pat. No. 8,079,048, filed Dec. 15, 2006 and entitled "SYSTEM AND METHOD OF SCHEDULING AN EVENT RELATED TO AN ADVERTISEMENT." The content of the above-identified application is incorporated herein by reference in its entirety.

FIELD OF THE DISCLOSURE

The present disclosure is generally related to systems and methods of scheduling events related to advertisements.

BACKGROUND

Television broadcasts often include advertising segments that are related to upcoming events, including upcoming scheduled television programs, retail sale events, community activities, and other types of scheduled events. To schedule a recording of an upcoming program, for example, a user typically leaves a currently viewed program to access an electronic program guide (EPG), locates the upcoming program within the EPG, selects the upcoming program, and schedules the digital recording. Alternatively, a user has to remember at a later time to access the EPG to configure a digital video recorder (DVR) function to record or tune to the program. Hence, there is a need for an improved system and method of scheduling an event related to an advertisement.

DETAILED DESCRIPTION OF THE DRAWINGS

Figure 1:
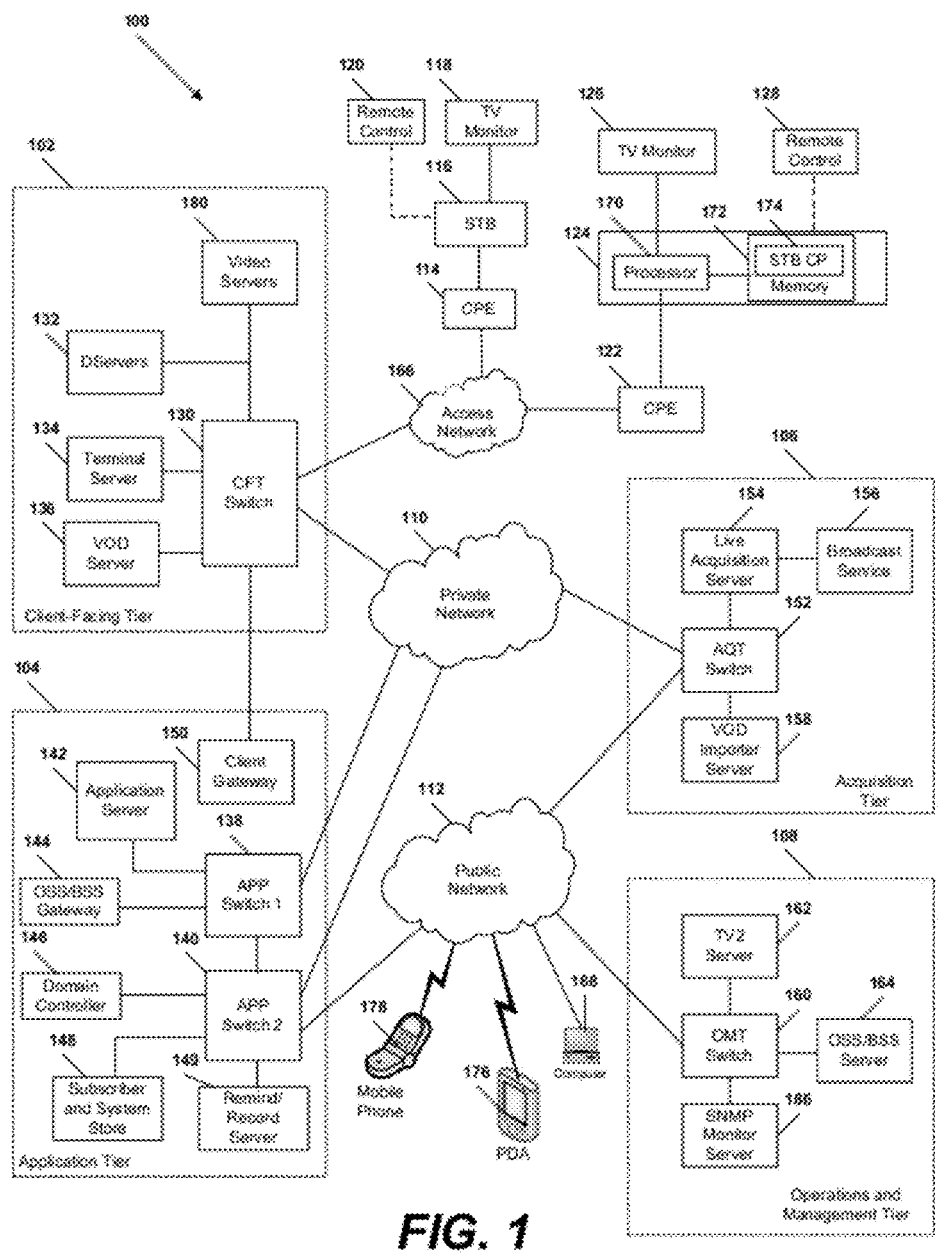
FIG. 1 is a block diagram of a particular illustrative embodiment of a system to schedule an event related to an advertisement.

In a particular illustrative embodiment, a method is disclosed that includes transmitting media content to a set-top box. The media content includes an advertisement having a selectable reminder indicator related to an event. The method further includes receiving an input selection related to the selectable reminder indicator from the set-top box, sending a first menu to the set-top box including at least one option to schedule a reminder associated with the event, and sending a second menu to the set-top box in response to receiving a selection of the at least one option, where the second menu includes a device menu including an option to specify a device order in which to send the reminder to a plurality of devices.

In another particular illustrative embodiment, a system is provided that includes a processor and a memory coupled to the processor. The memory includes a record module, a device module, and a reminder module. The record module is executable by the processor to schedule a record operation of a program associated with an advertisement via a network digital video recorder when an input selection of a selectable reminder indicator associated with an event includes a record input. The device module is executable by the processor to enable selection of a plurality of communication devices to receive a reminder associated with the event and to specify a device order of the plurality of communication devices. The reminder module executable by the processor to schedule transmission of the reminder to a first communication device of the plurality of communication devices based on the device order at one or more selected times when the input selection includes a reminder input.

In another particular illustrative embodiment, a non-transitory processor readable storage medium embodies processor readable instructions operable to cause a processor to transmit media content to a set-top box. The media content includes an advertisement having a selectable reminder indicator related to an event. The non-transitory processor readable storage medium embodies processor readable instructions operable to receive an input selection related to the selectable reminder indicator, to receive first data identifying a plurality of devices, to receive a device order for transmitting to the plurality of devices, and to schedule a first reminder related to the event for transmission to a first device of the plurality of devices based on the device order at a first time based on the input selection and to schedule a second reminder related to the event for transmission to a second device of the plurality of devices based on the device order at a second time based on the input selection. In a particular illustrative embodiment, the reminder may be transmitted to a mobile phone, a personal digital assistant (PDA), a set-top box device, a computer, or any combination thereof. Additionally, the reminder may be sent to an email address, a phone number, an instant message account, or any combination thereof to provide a reminder of an upcoming event.

Referring to FIG. 1, an illustrative embodiment of an Internet Protocol Television (IPTV) system that may be used to provide a set-top box application is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 166, such as an Internet Protocol Television (IPTV) access network. In an illustrative embodiment, customer premises equipment (CPE) 114, 122 can be coupled to a local switch, router, or other device of the access network 166. The client-facing tier 102 can communicate with a first representative set-top box device 116 via the first CPE 114 and with a second representative set-top box device 124 via the second CPE 122. In a particular embodiment, the first representative set-top box device 116 and the first CPE 114 can be located at a first customer premise, and the second representative set-top box device 124 and the second CPE 122 can be located at a second customer premise. In another particular embodiment, the first representative set-top box device 116 and the second representative set-top box device 124 can be located at a single customer premise, both coupled to one of the CPE 114, 122. The CPE 114, 122 can include routers, local area network devices, modems, such as digital subscriber line (DSL) modems, any other suitable devices for facilitating communication between a set-top box device and the access network 166, or any combination thereof.

In an exemplary embodiment, the client-facing tier 102 can be coupled to the CPE 114, 122 via fiber optic cables. In another exemplary embodiment, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a connection point to the private network 110. In a particular embodiment, the CFT switch 130 can be coupled to a video-on-demand (VOD) server 136 that stores or provides VOD content imported by the IPTV system 100. Further, the CFT switch 130 is coupled to one or more video servers 180 that receive video content and transmit the content to the set-top boxes 116, 124 via the access network 166.

In an illustrative embodiment, the client-facing tier 102 can communicate with a large number of set-top boxes, such as the representative set-top boxes 116, 124 over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the access network 166, which enable the set-top box devices 116, 124 to provide functions, such as interactive program guides, video gaming, display, messaging, processing of VOD material and other IPTV content, etc. In an illustrative embodiment, the application server 142 can provide location information to the set-top box devices 116, 124. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses, stockkeeping unit (SKU) numbers, other identifiers, or any combination thereof, of corresponding set-top box devices 116, 124. In another illustrative embodiment, the subscriber and system store can store data associated with capabilities of set-top box devices associated with particular customers.

In a particular illustrative embodiment, the application tier 104 may also include a reminder/record server 149 to schedule an event related to an advertisement. For example, the reminder/record server 149 may schedule transmission of a reminder to one or more devices in response to selection of a selectable indicator embedded within an advertisement of a media stream.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116,124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor server 186 that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

In a particular illustrative embodiment, a selectable indicator may be embedded within an advertisement by an advertising content source prior to acquisition of the advertisement. Alternatively, the video servers 180 may insert targeted advertisements, including selectable indicators, into video content at appropriate locations. The video servers 180 can transmit media content that includes an advertisement having a selectable indicator, such as a record indicator or a reminder indicator, to a set-top box device, such as the STB 124. The STB 124 may receive an input selection related to the selectable indicator and can send data to the record/reminder server 149. The data may include instructions to schedule a reminder or a record operation related to the advertisement. In a particular illustrative embodiment, the record/reminder server 149 can generate reminders related to the advertisement in one or more data formats and transmit the reminders to selected devices, such as the computer 168, a personal digital assistant (PDA) 176, a mobile telephone 178, the STB 124, or any combination thereof.

For example, if the advertisement is related to an upcoming scheduled program, a reminder may be transmitted to one or more devices, such as the computer 168, the PDA 176, the mobile phone 178 or the STB 124. The reminder may include information related to the upcoming scheduled program, so that a user is reminded to tune the STB 124 to the upcoming scheduled program. Alternatively, the user may be reminded to access an electronic program guide to schedule a digital video recorder function to record the upcoming scheduled program.

In another particular illustrative embodiment, if the advertisement is related to an upcoming event, such as a community event, a sale event, or some other upcoming occasion, a reminder may be scheduled based on an input selection, and the record/reminder server 149 may transmit a reminder to one or more devices, such as the computer 168, the PDA 176, the mobile phone 178, the STB 124, or any combination thereof. The reminder may include information related to the upcoming event, such as the date, the time, and the location, so that the user is reminded of the event at some other time.

In a particular illustrative embodiment, a user may see an advertisement for an "early bird" sale event at a particular retail establishment, where the advertisement includes a selectable reminder indicator. The user may select the selectable reminder indicator to schedule a reminder to be transmitted to one or more devices to remind the user (at a later time) about the sale event. In a particular illustrative embodiment, the user may specify selected devices, selected data formats, and times for transmission of the reminder. For example, a user may access a reminder menu at the STB 124 to cause the record/reminder server 149 to transmit a reminder as a pop-up to the set-top box 124 for display via the display device 126 two hours prior to the sale event. A user may also specify transmission of the reminder to the mobile phone 178, to the PDA 176, or to the computer 168 in selected formats, including instant messages, text messages, email, or audio alerts. For example, the user may configure the system 100 to send a second reminder of the sale event to the mobile phone 178 as a text message or as an audio alert thirty minutes prior to the sale event.

Figure 2:
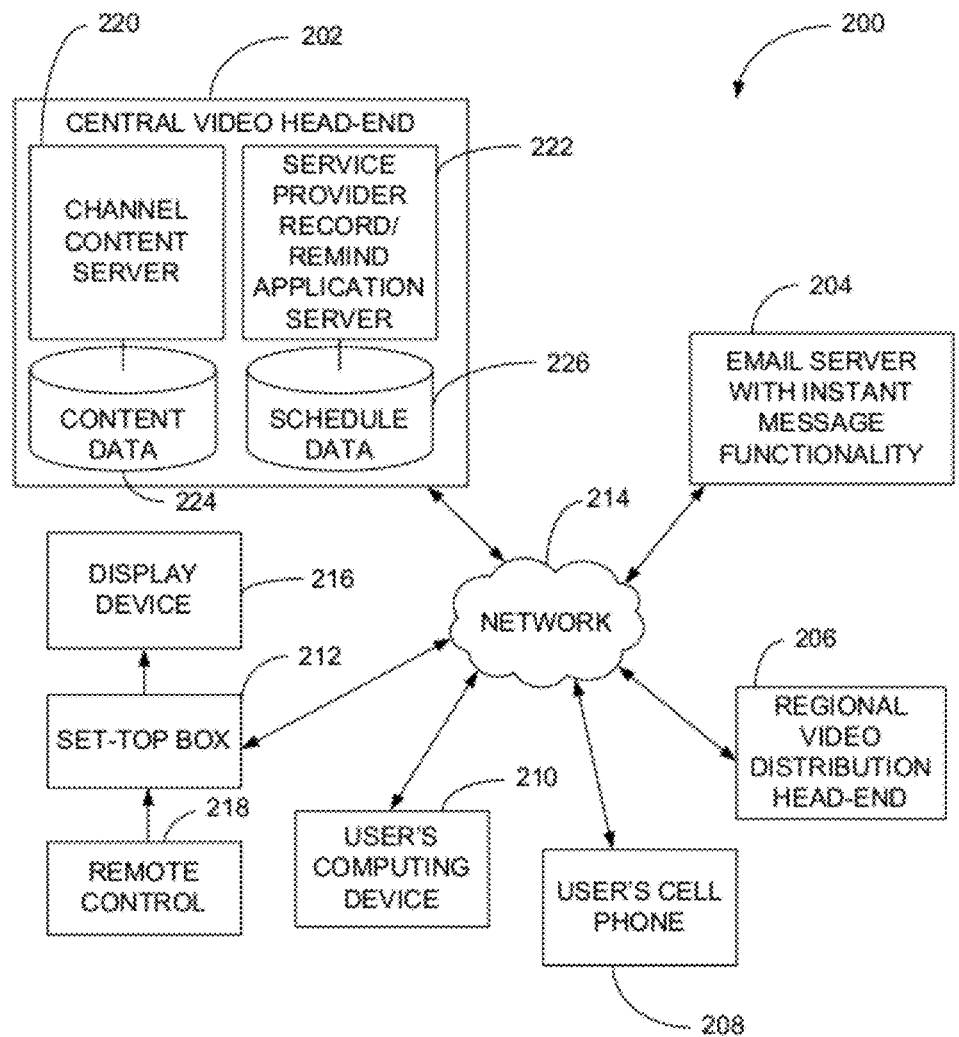
FIG. 2 is a block diagram of a second particular illustrative embodiment of a system to schedule an event related to an advertisement.

FIG. 2 is a block diagram of a second particular illustrative embodiment of a system 200 to schedule an event related to an advertisement. The system 200 includes a central video head-end system 202, an email server 204 with instant message functionality, a regional video distribution head-end system 206, a user's cell phone 208, a user's computing device 210 and a set-top box device 212 that are communicatively coupled via a network 214, which may be an Internet Protocol (IP) network. The set-top box 212 may be coupled to a display device 216 and may be responsive to a remote control device 218 to receive user inputs. The central video head-end system 202 may include a channel content server 220, a service provider record/remind application server 222, content data 224, and schedule data 226.

In a particular illustrative embodiment, the central video head-end system 202 is adapted to distribute media content to the set-top box device 212 via the network 214. The media content may include an advertisement with a selectable indicator. The set-top box device 212 is adapted to receive the media content including the advertisement with the selectable indicator and to provide the media content to the display device 216. The set-top box device 212 may receive an input selection related to the selectable indicator and transmit the input selection to the central video head-end system 202. The service provider record/remind application server 222 may schedule a record operation or a remind operation according to the input selection. When the scheduled operation is a record operation, the service provider record/remind application server 222 may record media content associated with the particular advertisement for later download to the set-top box 212. Alternatively, the service provider record/remind application server 222 may transmit a control signal to the set-top box device 212 to access a digital video recorder (DVR) function at a desired time to trigger the set-top box 212 to record the media content associated with the input selection.

In a particular illustrative embodiment, when the input selection is a reminder selection, the service provider record/remind application server 222 may generate a reminder in one or more formats for transmission to one or more user devices. For example, the service provider record/remind application server 222 may generate an audio alert (for example, by converting text to speech to produce the audio alert) and transmit the audio alert to the user's cell phone 208. Alternatively, the service provider record/remind application server 222 may generate a pop up reminder for transmission to the set-top box 212 for display at the display device 216. In another particular illustrative embodiment, the service provider record/remind application server 222 may transmit a reminder via the email server 204 in an email format, a text message format or an instant message format to the user's computing device 210, the user's cell phone 208, or to another electronic device, such as the PDA 176 in FIG. 1.

In a particular illustrative embodiment, an agreement may be made between a service provider and a content producer to run a promotional advertisement for an upcoming television program, for an upcoming community event, for an upcoming sale event, or for another upcoming event. The agreement may include the reminder and/or record functionality. The service provider may configure the record/remind application server 222 with appropriate record and reminder options for the promotional advertisement. For example, if the promotional advertisement is a commercial related to an upcoming television program, the advertisement may include selectable indicators for both the record and the reminder options. In a particular illustrative embodiment, if the promotional advertisement is related to an event (such as a sales event, a community activity, or some other event), the promotional advertisement may include a selectable indicator for the reminder option, but not for the record option.

The service provider may establish an appropriate trigger within video content of the content data 224 to trigger a pop-up within the video content at an appropriate time while the promotional advertisement is being displayed at the display device 216. In a particular illustrative embodiment, the trigger can be included in a Moving Pictures Expert Group-2 (MPEG2) transport stream that carries the media content, which may include Internet Protocol Television (IPTV) MPEG4 channel content. In a particular embodiment, the trigger can be a cue tone within the serial digital content sent by the central video head end system 202. In another particular embodiment, the trigger can be time-based (e.g., triggered at a particular time). A pop up can be triggered at the set-top box 212 based on the embedded trigger within the promotional advertisement.

In a particular embodiment, the channel content server 220 can provide the promotional advertisement within media content transmitted to the set-top box device 212 via the network 214, which may be a backbone private or public Internet Protocol (IP) network. In an illustrative embodiment, the media content may be transmitted to the regional video distribution head-end system 206 and through a regional private network (not shown) or via the network 214 to the set-top box device 212. The media content may be provided to the display device 216 by the set-top box device 212. In a particular embodiment, the linear channel content may be cached in a channel content cache server (not shown) within the regional video distribution head end system 206.

In a particular illustrative embodiment, the channel content server 220 sends a trigger to the service provider record/remind application server 222 when a record and remind option should be provided to the set-top box device 212 for display at the display device 216. The service provider record/remind application server 222 may invoke an application within the set-top box device 212 to provide a pop up at the display device 216 including the record or remind options, such as a selectable record indicator and a selectable reminder indicator. If the viewer wishes to record a program associated with the promotional advertisement or to receive a reminder of the program, the pop up includes instructions to select a specific button on the remote control to initiate (schedule) the recording or reminder.

In a particular illustrative embodiment, if the user selects the selectable record indicator, the user may be presented with the recording options on the display device 216. The recording options may be retrieved from a memory of the set-top box 212 or may be transmitted to the set-top box 212 from the service provider record/remind application server 222. The user may select DVR options for the particular promotional advertisement and initiate the scheduled record event. The selected DVR options may be transmitted to the record/remind application server 222. The service provider record/remind application server 222 may communicate the selected DVR options to the set-top box device 212 to trigger the recording at a specified time. Alternatively, the service provider record/remind application server 222 may configure a network DVR module (not shown) to provide the DVR function by recording the program at the central video head-end system 202 or at the regional video distribution head-end system 206.

In another particular illustrative embodiment, if the user selects the selectable reminder indicator, the user may be presented with a reminder menu, including reminder options, at the display device 216. In a particular illustrative embodiment, the reminder options may be retrieved from a memory of the set-top box device 212. In another particular embodiment, the reminder options may be sent to the set-top box device 212 from the service provider record/remind application server 222. The user may select (configure) the reminder options to schedule transmission of one or more reminders associated with the promotional advertisement. The reminder options may allow the user to specify one or more devices, to identify desired a desired data format for each of the one or more devices, and to specify one or more reminder times. For example, a user may wish to receive three reminders at a particular device over a period of time, such as one hour before the scheduled event, 15 minutes before the scheduled event, and 5 minutes before the scheduled event. In another particular illustrative embodiment, a user may wish to receive a first reminder at a first device at a first time, a second reminder at a second device at a second time, and a third reminder at a third device at a third time. For example, the user may wish to receive a reminder two hours before an event at a work email address, thirty minutes prior to an event as a pop up reminder at a television via a set-top box device, and 10 minutes prior to an event as a text message (or an audio alert) at a mobile telephone.

In a particular embodiment, the service provider record/remind application server 222 may store the reminder information in the schedule database 226. When the reminder options are configured for an email reminder, the service provider record/remind application server 222 may send the reminder to an email address associated with the user at the scheduled time via the email server 204. When the reminder options are configured for an instant message (IM) reminder, the service provider record/remind application server 222 may send the reminder to an IM account of the user at the scheduled time. When the reminder options are configured for a pop up reminder, the service provider record/remind application server 222 may send a pop-up to the set-top box 212 at the scheduled time. When the reminder options are configured for a mobile phone reminder, the service provider record/remind application server 222 may utilize a wireless access point (WAP) server to send the reminder to a mobile phone, such as the mobile phone 208, at the scheduled time.

Figure 3:
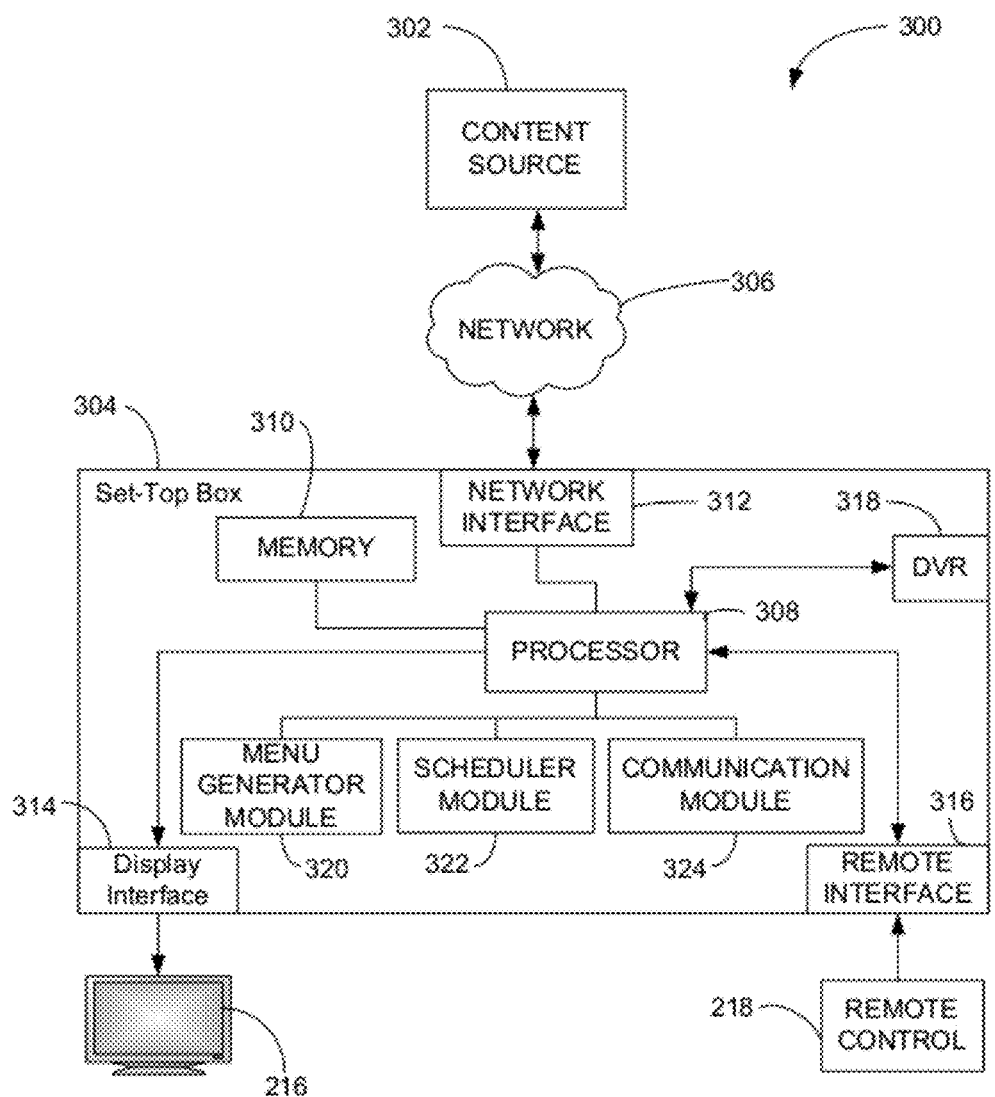
FIG. 3 is a block diagram of third particular illustrative embodiment of a system to schedule an event related to an advertisement.

FIG. 3 is a block diagram of third particular illustrative embodiment of a system 300 to schedule an event related to an advertisement. The system 300 may include a content source 302, such as the central video head-end system 202 in FIG. 2, and a set-top box device 304 communicatively coupled to the content source 302 via a network 306. The set-top box device 304 may include a processor 308, a memory 310, a network interface 312, a display interface 314, and a remote interface 316. The set-top box 304 may also include a digital video recorder module 318, a menu generator module 320, a scheduler module 322, and a communication module 324. The set-top box 304 may be coupled to a display device 216 via the display interface 314 and may be adapted to receive input selections from a remote control 218 via the remote interface 316.

In a particular illustrative embodiment, the set-top box 304 may receive media content from the content source 302 via the network 306. The media content may include an advertisement with a selectable indicator, such as an image or an icon, that is related to the advertisement. The media content may be decoded by the processor 308 and provided to the display device 216 via the display interface 314. The set-top box 304 may receive an input selection related to the selectable indicator via the remote interface 316. For example, a user may select a button on the remote control that corresponds to the selectable indicator. For example, the selectable indicator may be square, a circle, a triangle, or another shape that corresponds to a button of the remote control 218. Alternatively, the selectable indicator may be color-coded to correspond to a color of a key of the remote control 218.

If the set-top box 304 receives an input selection related to the selectable indicator, the processor 308 may process the input selection to identify an option menu associated with the input selection. The set-top box 304 may either retrieve the identified option menu from the memory 310 or may cause the menu generator module to generate the option menu for display at the display device 216. The user may provide input selections related to the option menu to configure a scheduled action. For example, the user may configure a record option menu or a reminder option menu to schedule a recording related to the advertisement, to schedule a reminder related to the advertisement, or any combination thereof. The input selections related to the option menu may be processed by the processor 308 to determine a required future action. The processor 308 may configure the scheduler module 322 according to the input selections to record a program related to the advertisement, to initiate communication of a reminder to a user device via the communication module 324, or any combination thereof. In a particular embodiment, the communication module 324 may be adapted to do one or more of the following: initiate a phone call reminder to a specified telephone number, to transmit an email or text message reminder to a specified device, to generate an instant message (IM) reminder to a specified IM account, or to generate a pop up reminder for display at the display device 216.

In another particular illustrative embodiment, scheduling of the record and reminder functionality may be performed by the content source 302 or by an application server associated with the content source 302. In such an instance, the input selections may be sent to the content source 302, and the content source 302 or an associated application server may trigger the set-top box 304 to display a pop-up reminder or to activate the DVR module 318 at a appropriate time based on the user's input selections.

Figure 4:
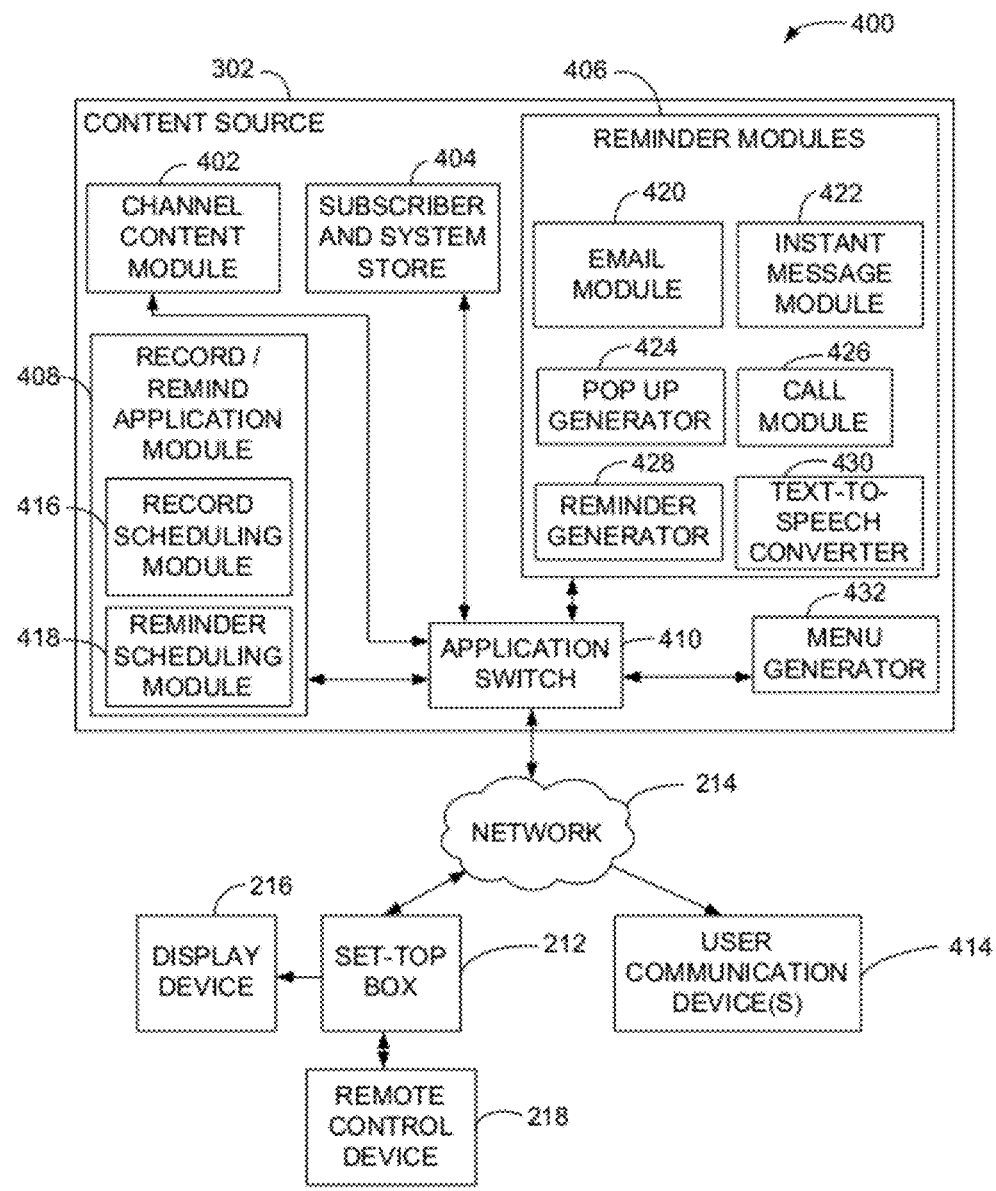
FIG. 4 is a block diagram of a fourth particular illustrative embodiment of a system to schedule an event related to an advertisement.

FIG. 4 is a block diagram of a fourth particular illustrative embodiment of a system 400 to schedule an event related to an advertisement. The system 400 includes a content source 302 coupled to a set-top box device 212 via a network 214. The set-top box device 212 may be coupled to a display device 216 and may be responsive to a remote control device 218 to receive user input selections. The system 400 may include a channel content module 402, a subscriber and system store 404, reminder modules 406, a record/remind application module 408, and an application switch 410, such as the application switch 138 in FIG. 1. The record/remind application module 408 may include a record scheduling module 416 and a reminder scheduling module 418. The reminder modules 406 may include an email module 420, an instant message module 422, a pop up generator module 424, call module 426, a reminder generator 428, and a text-to-speech converter module 430. Additionally, the content source 302 may include a menu generator module 432.

In a particular illustrative embodiment, the channel content module 402 is adapted to provide media content to the network 214 via the application switch 410. The media content may include an advertisement with one or more selectable indicators. The media content may be received by the set-top box 212 via the network 214 and may be provided to the display device 216. A user may utilize the remote control device 218 to provide an input selection related to the one or more selectable indicators of the advertisement to the set-top box 212. The set-top box 212 may provide the input selection to the content source 302. If the input selection is a record selection, the content source 302 may schedule a record operation using the record scheduling module 416. In a particular illustrative embodiment, the record scheduling module 416 may record media content associated with the advertisement (such as when the advertisement is a promotion for an upcoming episode of a television program) based on the input selection. In another particular illustrative embodiment, the record scheduling module 416 may provide a record trigger to the set-top box device 212 to initiate recording by a digital video recorder (DVR) of the set-top box device 212 at the time of a program associated with the advertisement.

In a particular illustrative embodiment, when the input selection is a reminder selection, the content source 302 may access the subscriber and system store 404 to determine preferences associated with the user for transmission of a reminder. The content source 302 may schedule reminders using the reminder scheduling module 418. The reminder scheduling module 418 may include logic to selectively activate one or more of the reminder modules 406 to generate a reminder in a particular format for transmission to a selected user communication device 414 via the network 214.

For example, the user preferences of a particular user may specify several devices and a device order for transmission of reminders. In a particular embodiment, the user may specify a mobile phone to receive an audio alert reminder, and the reminder scheduling module 418 may activate the reminder generator 428 to generate a reminder message, activate the text-to-speech converter module 430 to convert the reminder message to an audio alert, and activate the call module to call the user's mobile telephone to deliver the audio alert at a specified time prior to the scheduled event. Subsequently, the reminder scheduling module may activate another module to transmit the reminder message in another format, such as an email format (via the email module 420) or an instant message format (via the instant message module 422) or to generate a pop up for display at the display device 216 (via the pop up generator), to remind the user of the upcoming event.

The upcoming event may be related to a scheduled television program. Alternatively, the scheduled event may be related to a sale event, a grand opening event, a community event, or other types of events. In the case of a television program, the content source 302 may provide both a record selectable indicator and a reminder selectable indicator. In the case of a community event, the content source 302 may provide the reminder selectable indicator, another indicator, or any combination thereof.

In a particular illustrative embodiment, the content source 302 may receive an input selection related to one of the one or more selectable indicators embedded within an advertisement within the media content. The content source 302 may activate the menu generator 432 to generate an option menu related to the input selection. The content source 302 may provide the option menu to the set-top box 212 via the network 214 for display on the display device 216. The set-top box 212 may receive user selections related to the option menu and may provide the user selections to the content source 302. Depending on the input selection, the content source 302 may provide the user selections to one of the record scheduling module 416 and the reminder scheduling module 418 to schedule recordation, reminders, or any combination thereof, according to the user selections.

Figure 5:
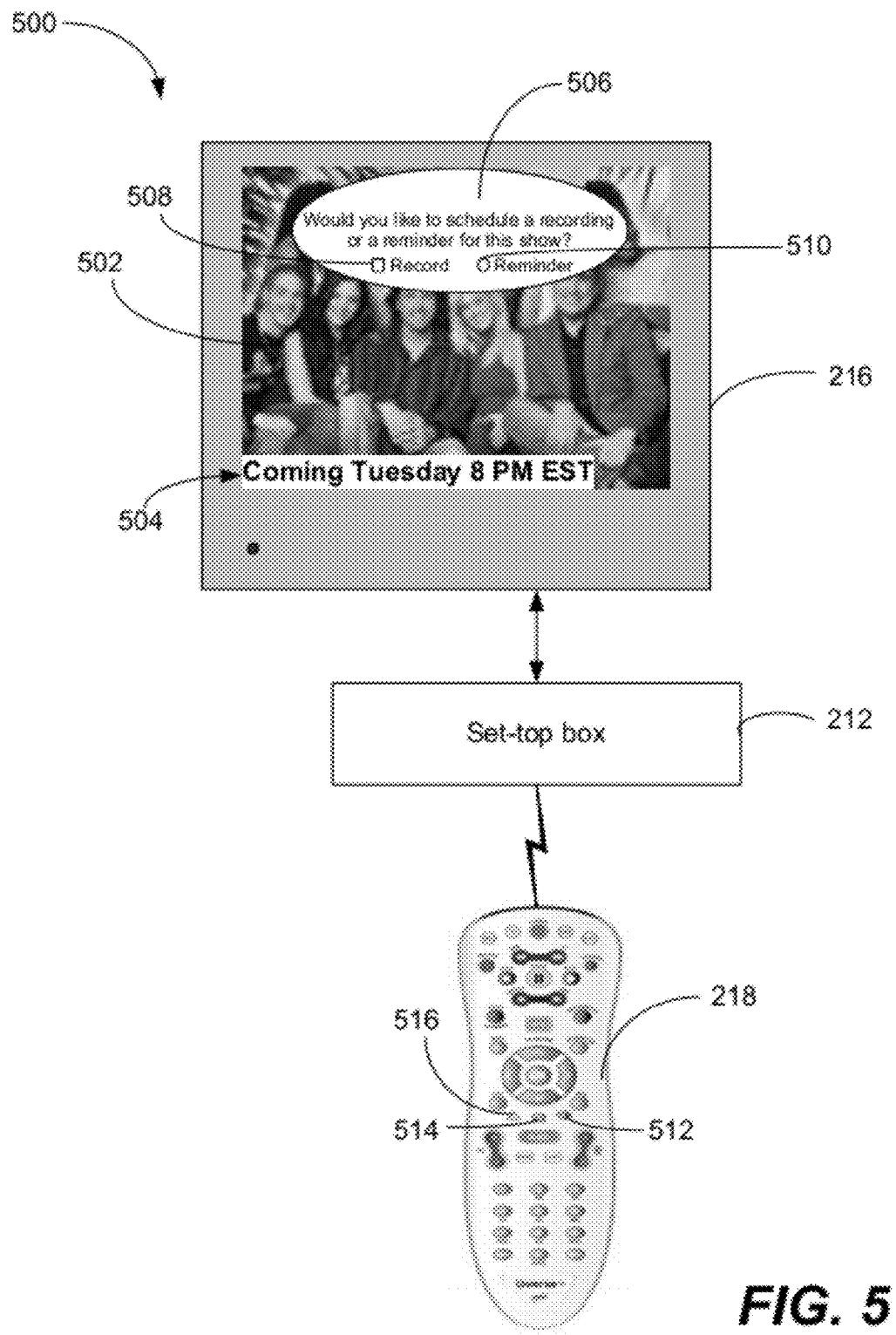
FIG. 5 is a general diagram of a particular illustrative embodiment of a user interface to schedule an event related to an advertisement.

FIG. 5 is a general diagram of a particular illustrative embodiment of a user interface 500 to schedule an event related to an advertisement. The user interface 500 may include a display window 502 including information related to an upcoming program 504 and an associated pop up window 506 including selectable indicators, such as a selectable record indicator 508 and a selectable reminder indicator 510. A remote control 218 may be used to interact with the user interface 500 via smart keys, such as a reminder button 512, a record button 514, and a cancel button 516.

While the selectable indicators 508 and 510 are being displayed on the display device 216, a user may select the reminder button 512 to trigger the selectable reminder indicator 510 to schedule a reminder associated with the upcoming program or may select the record button 514 to trigger the selectable record indicator 508 schedule a recording for the upcoming program. In response to an input selection related to one of the selectable indicators 508 and 510, the set-top box 212 may display an option menu to enable the user to configure the particular function. For example, the record menu may allow the user to configure a recurring or one time only record operation. The reminder menu may allow a user to configure reminder options, such as selected devices, selected formats and associated times for transmitting reminders.

Figure 6:
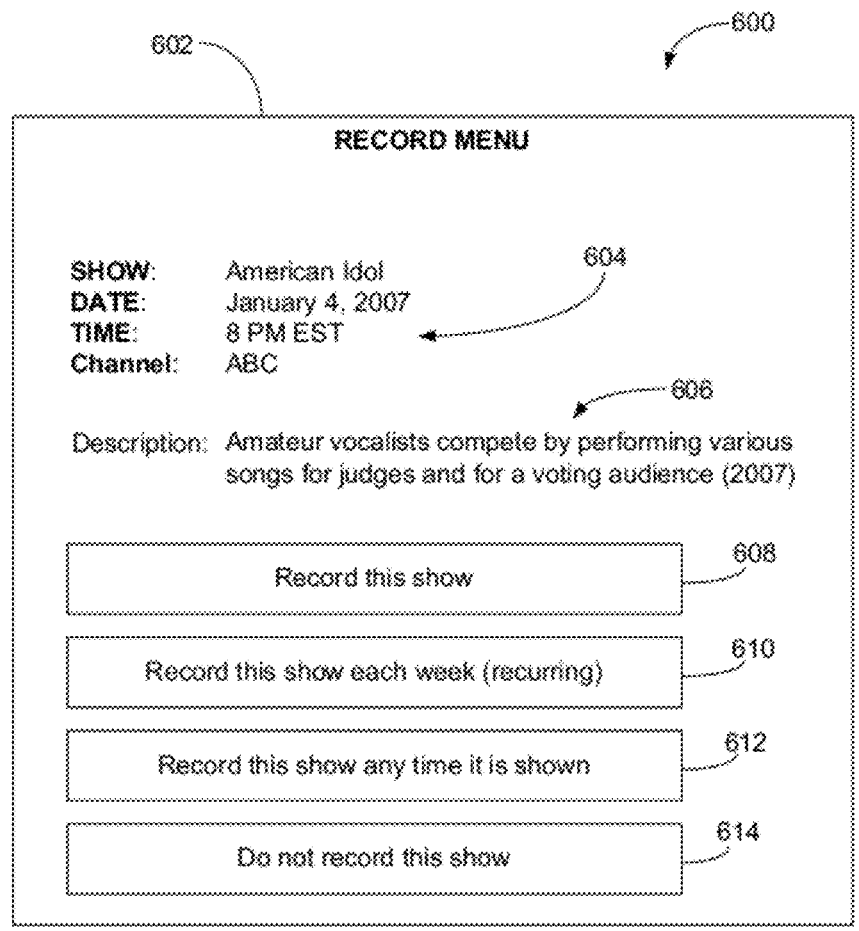
FIG. 6 is a block diagram of a second particular illustrative embodiment of a user interface to schedule an event related to an advertisement.

FIG. 6 is a block diagram of a second particular illustrative embodiment of a user interface 600 to schedule an event related to an advertisement. The user interface 600 may be provided by a set-top box such as the set-top box 212 in FIGS. 2 and 5, to allow a user to configure a record option upon receipt of an input selection related to a selectable record indicator. The user interface 600 may include a record menu 602 including information about an upcoming show 604, such as the name, date, time and channel information associated with the upcoming program. The record menu 602 may also include a brief description 606 of the show, and selectable indicators of recording options, such as a "Record this show" indicator 608, a "Record this show each week (recurring)" indicator 610, a "Record this show any time it is shown" indicator 612, and a "Do not record this show" indicator 614. Selection of one of these selectable indicators configures the system to perform the requested function.

It should be understood that the user interface 600 is shown for illustrative purposes only. Other configurable options may also be provided in the record menu 602, depending on the specific implementation. For example, in a system that allows for intelligent content searching, the record menu 602 may include options to allow a user to enter content search criteria and to record program segments related to particular subject matter.

Figure 7:
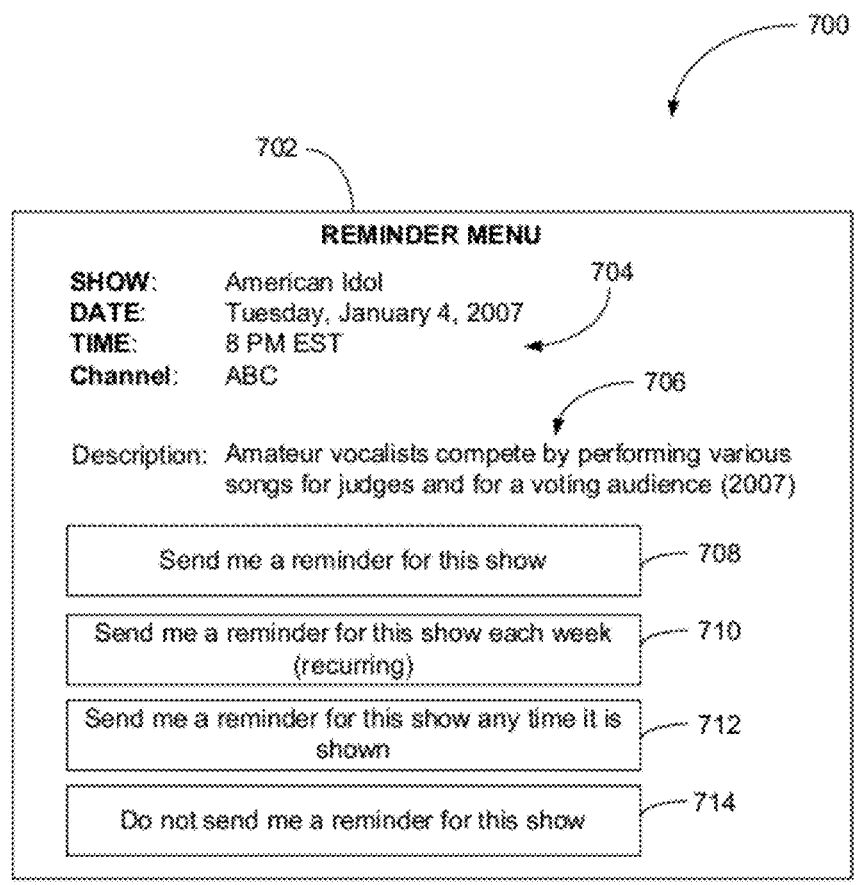
FIG. 7 is a block diagram of a third particular illustrative embodiment of a user interface to schedule an event related to an advertisement.

FIG. 7 is a block diagram of a third particular illustrative embodiment of a user interface 700 to schedule an event related to an advertisement. The user interface 700 may be provided by a set-top box, such as the set-top box 212 in FIGS. 2 and 5, to allow a user to configure a reminder option upon receipt of an input selection related to a reminder selectable indicator. In this instance, the reminder menu is related to an advertisement of an upcoming television program (e.g., American Idol). The user interface 700 includes a reminder menu 702. The reminder menu 702 includes information about the upcoming program 704, such as the name, date, time and channel information. The reminder menu 702 may also include a brief description 706 of the program and selectable indicators of reminder options, such as a "Send me a reminder for this show" indicator 708, a "Send me a reminder for this show each week (recurring)" indicator 710, a "Send me a reminder for this show any time it is shown" indicator 712, and a "Do not send me a reminder for this show" indicator 714. Selection of one of these selectable indicators configures the system to generate and transmit reminders related to the requested function.

Figure 8:
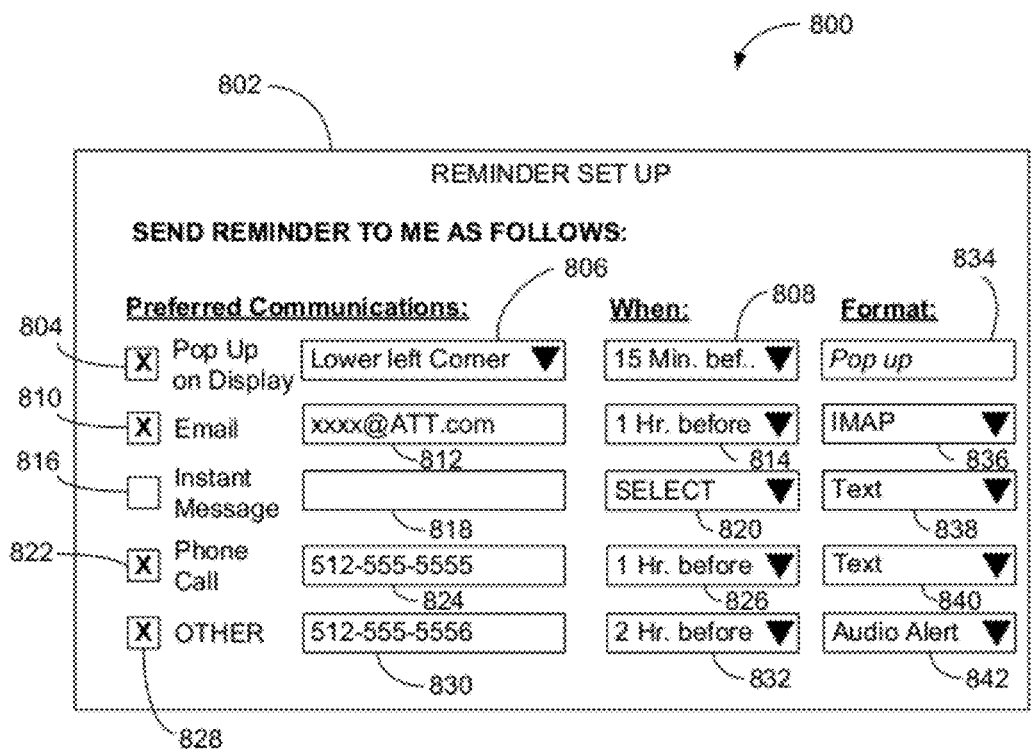
FIG. 8 is a block diagram of a fourth particular illustrative embodiment of a user interface to schedule an event related to an advertisement.

FIG. 8 is a block diagram of a fourth particular illustrative embodiment of a user interface 800 to schedule an event related to an advertisement. The user interface 800 includes a reminder set up menu 802, which a user to configure a set-top box or a content source to selectively communicate a reminder to one or more devices, in one or more selected device formats, and at selected reminder times. For example, the reminder set up menu 802 includes a pop up on display checkbox 804, a position pull down menu 806 associated with the display, and a time parameter pull down menu 808 associated with the pop up. The reminder set up menu 802 also includes an email checkbox 810, an email address text box 812, and a time parameter pull down menu 814 associated with the email option. The reminder set up menu 802 also includes an instant message check box 816, an instant message address input 818, and a time parameter pull down menu 820 associated with the instant message option. Further, the reminder set up menu 802 may include a phone call checkbox 822, a phone number input 824, and a time parameter pull down menu 826 associated with the phone call option. Additionally, the reminder set up menu 802 may include an "other" checkbox 828, an other text input 830, and a time parameter pull down menu 832 associated with the other option 832. In a particular embodiment, a user may configure the system to transmit two separate reminders at different times to the same device by entering, for example, the same phone number in the other text input 830 as the phone number entered in the phone number input 824.

The reminder set up menu 802 may also include a set of inputs to configure a format of the reminder. For example, the pop up checkbox 804 may be associated with a pop up format 834. The email checkbox 810 may be associated with a format pull down menu 836 that allows a user to select between various email formats, including text only format, hypertext markup language (HTML) format, pop3 format, an internet message access protocol (IMAP) format, an audio alert format, other formats, or any combination thereof. As shown, the email format pull down menu 836 is configured for an IMAP format, which may allow the system to send an email reminder in the form of a calendar schedule request to the user's email account, which the user may accept to automatically update an associated calendar application. The instant message checkbox 816 may be associated with a format pull-down menu 838, which is configured for text format. The phone call checkbox 822 may be associated with a format pull down menu 840, which is configured for text format. The other check box 828 may be associated with a format pull-down menu 842, which is configured for an audio alert. In a particular embodiment, the audio alert format may be an audible alert that is generated, for example, using a text-to-speech converter. The reminder set up menu 802 may allow a user to configure reminders to selected devices in different formats and at different times.

For example, if the pop up on display option is selected for a lower left corner at a time that is 15 minutes prior to the beginning of the show, a pop up reminder may be transmitted to the set-top box for display in the lower left corner of the display device 15 minutes before the show. If the email message checkbox 810 is selected, an email may be sent to the specified address at a specified time (e.g., an email may be sent to xxxx@ATT.com approximately 1 hour before the show). The reminder set up menu 802 allows the user to configure multiple reminders to multiple devices at different times. In the reminder set up menu 802, four separate devices are scheduled for reminders, and three of the four devices are scheduled to receive reminders at different times and in four different formats.

Figure 9:
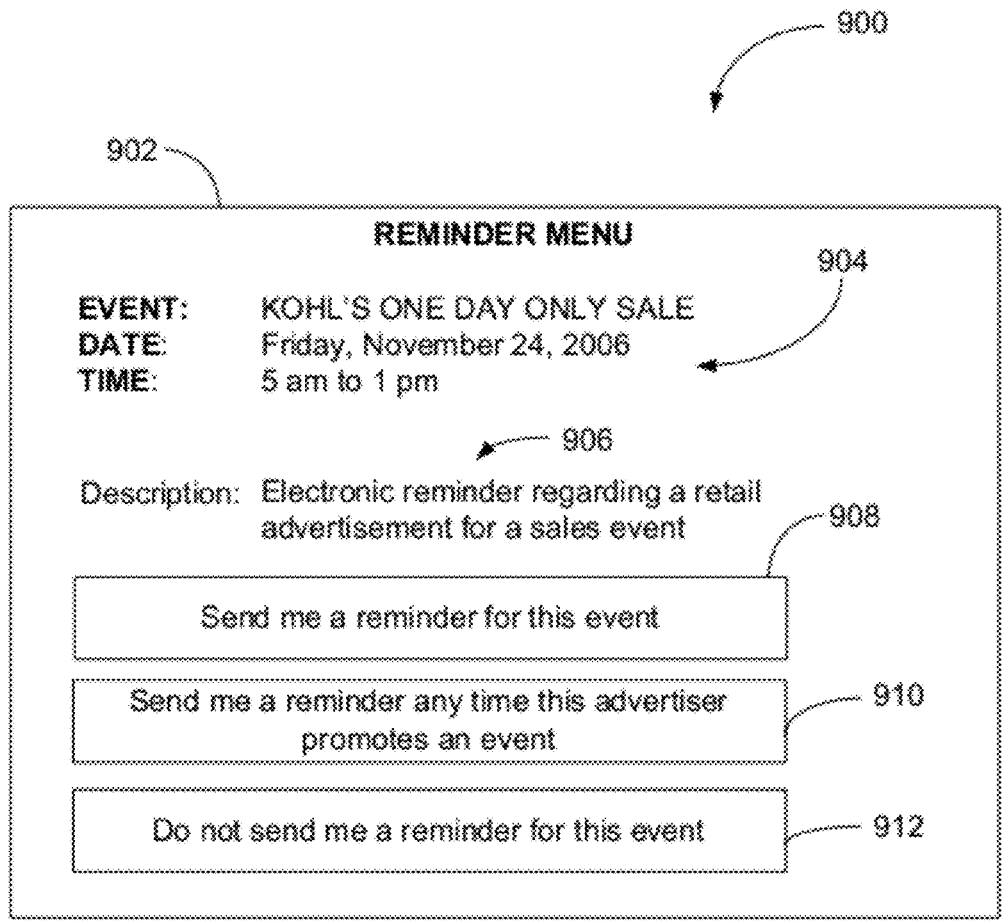
FIG. 9 is a block diagram of a fifth particular illustrative embodiment of a user interface to schedule an event related to an advertisement.

FIG. 9 is a block diagram of a fifth particular illustrative embodiment of a user interface 900 to schedule an event related to an advertisement. In the embodiments illustrated in FIGS. 5-7, the scheduled event was related to a television program. However, a selectable reminder indicator may be embedded within any advertisement for an upcoming promotion, allowing a user to configure the system to provide a reminder of the upcoming event, whether it is a retail sale event at a local retail establishment or a community event, such as a parade, a festival, or other community event, or some other scheduled event. Additionally, the selectable reminder indicator may be provided within a public service announcement, such as an advertisement reminding people to vote. In a particular illustrative embodiment, an advertising content source may include meta-data associated with the selectable indicator to provide reminder information for display via the user interface 900, including an event duration, title, description, location information, and other data.

The user interface 900 includes a reminder menu 902 that includes information related to an advertised event 904, such as a "One Day Only" sale by a retailer, such as Kohl's, as well as the date and time range of the event. The advertiser may also provide an associated description of the event 906. The reminder menu 902 may include selectable indicators of reminder options, such as a "Send me a reminder for this event" indicator 908, a "Send me a reminder any time this advertiser promotes an event" indicator 910, and a "Do not send me a reminder for this event" indicator 912. A user may select a reminder option to configure the system to transmit a reminder associated with the advertised event to one or more of the user's selected devices, such as the devices shown in the set up menu 802 illustrated in FIG. 8.

Figure 10:
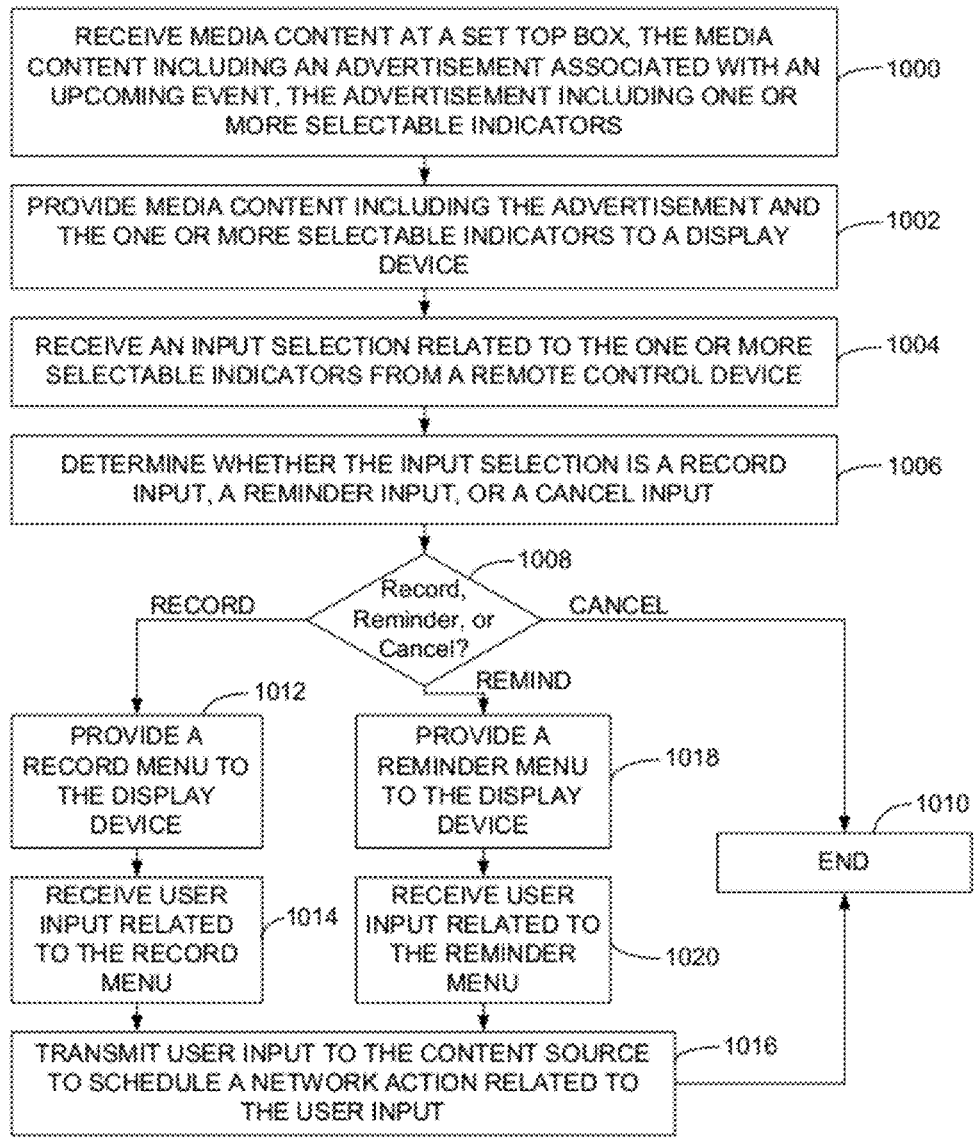
FIG. 10 is a flow diagram of a particular illustrative embodiment of a method of scheduling an event related to an advertisement.

FIG. 10 is a flow diagram of a particular illustrative embodiment of a method of scheduling an event related to an advertisement. The method includes receiving media content from a content source at a set-top box coupled to a display device, where the media content includes an advertisement having one or more selectable indicators, at 1000. The set-top box provides the media content to the display device, at 1002. An input selection related to a selected indicator of the one or more selectable indicators is received at the set-top box, at 1004. The set-top box determines if the input selection is a record input, a reminder input, or a cancel input, at 1006. If the input selection is a cancel input at 1008, the method terminates, at 1010. Returning to 1008, if the input selection is a record input, a record menu is provided to the display device, at 1012. In a particular illustrative embodiment, the record option menu includes options to configure a digital video recorder function to record a program related to the advertisement. The set-top box receives a user input related to the record menu, at 1014. The user input is transmitted to the content source to schedule a network action related to the user input, at 1016. The method terminates, at 1010.

Returning to 1008, if the input selection is a remind input, a reminder menu is provided to the display device by the set-top box, at 1018. In a particular illustrative embodiment, the reminder option menu includes options to configure a reminder function to schedule transmission of one or more reminders to one or more selected devices. The set-top box receives a user input related to the reminder menu, at 1020. The user input is transmitted to the content source to schedule a network action related to the user input, at 1016. The method terminates, at 1010.

In a particular illustrative embodiment, the one or more selectable indicators include a record indicator and a reminder indicator. In a particular embodiment, the method may include scheduling a first reminder to a first device of the one or more selected devices in a first format for transmission at a first time and scheduling a second reminder to a second device of the one or more selected devices in a second format for transmission at a second time. In another particular illustrative embodiment, the method may include scheduling both recording at the set-top box device and one or more reminders to be sent to one or more devices of the one or more selected devices.

In another particular illustrative embodiment, the option menu may be received from the content source. In still another particular illustrative embodiment, a processor of the set-top box may identify a function related to the input selection, and the option menu may be retrieved from a memory of the set-top box based on the identified function.

Figure 11:
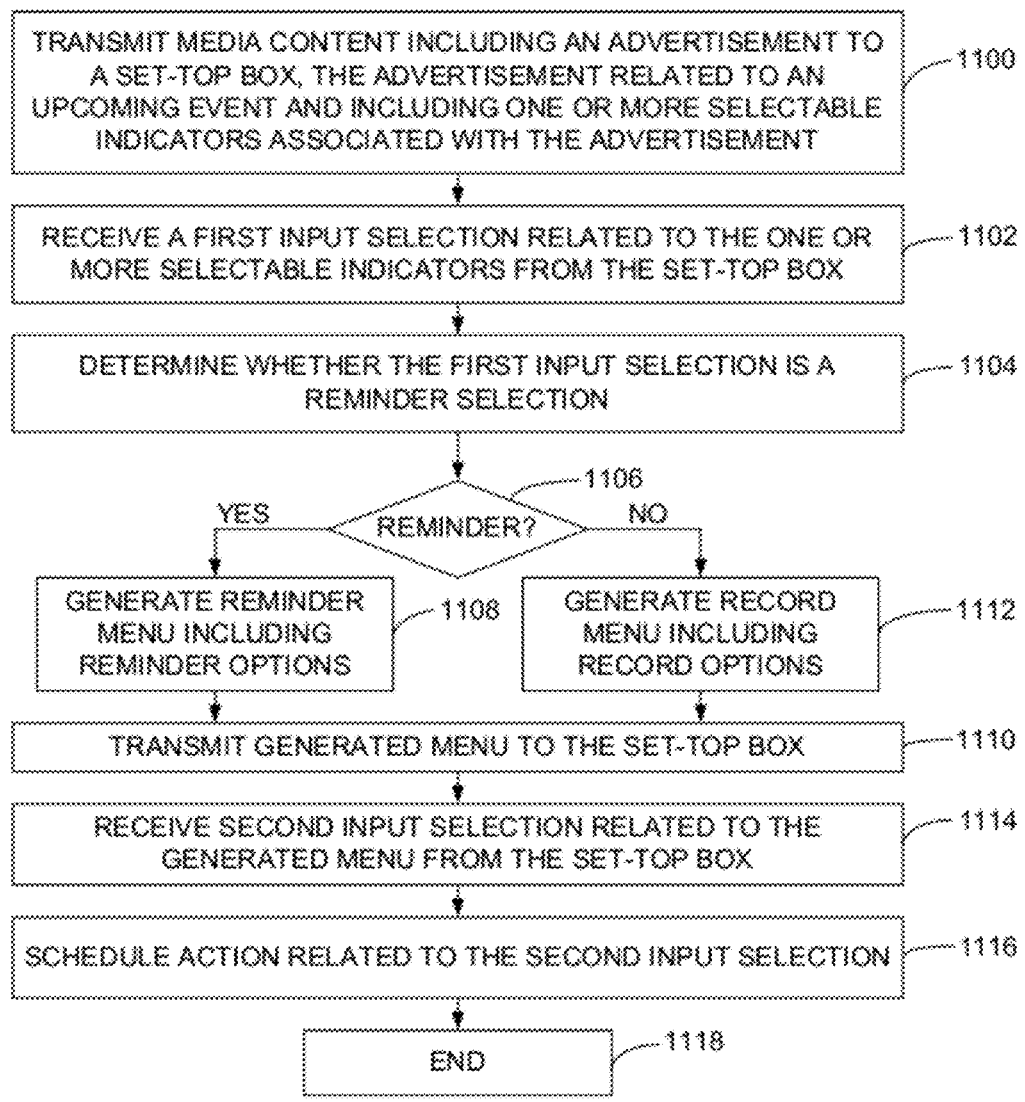
FIG. 11 is a flow diagram of a second particular illustrative embodiment of a method of scheduling an event related to an advertisement.

FIG. 11 is a flow diagram of a second particular illustrative embodiment of a method of scheduling an event related to an advertisement. The method includes transmitting media content to a set-top box coupled to a display device, where the media content includes an advertisement having a selectable indicator related to a reminder function, at 1100. The content source receives a first input selection related to the selectable indicator, at 1102. The content source determines whether the first input selection is a reminder selection, at 1104. If the first input selection is a reminder selection at 1106, a reminder menu is generated that includes reminder options, at 1108. The generated menu is transmitted to the set-top box, at 1110. Returning to 1106, if the input selection is not a reminder selection, a record menu is generated that includes recording options, at 1112, and the generated menu is transmitted to the set-top box at 1110.

A second input selection related to the generated menu is received from the set-top box, at 1114. An action related to the second input selection is scheduled, at 1116. The method terminates, at 1118.

In a particular embodiment, a reminder is scheduled for transmission to one or more selected devices based on the input selection, where the reminder is related to the advertisement. In a particular illustrative embodiment, the content source is adapted to determine one or more devices to which to transmit the reminder. The content source may determine the one or more devices according to a user preference. In another particular embodiment, the content source may identify a data format associated with each of the one or more selected devices. The content source may generate a reminder in a first format that is related to a first device of the one or more selected devices and may transmit the reminder to the first device in the first format. The content source may generate the reminder in a second format that is related to a second device of the one or more selected devices and may transmit the reminder to the second device in the second format. The reminders may be sent to different devices at the same time or at different times. Additionally, the reminder may be sent to a particular device more than once at different times.

In a particular illustrative embodiment, the advertisement may include a commercial related to an upcoming scheduled television program, an upcoming community event, or an upcoming sale event. A reminder menu may be provided by the content source to the set-top box to configure the one or more selected devices and to configure associated reminder options. The method may include transmitting the reminder to at least one of the one or more selected devices in a data format, such as an email message, a text message, an audio announcement, a pop-up visual indicator, or any combination thereof. In a particular illustrative embodiment, the one or more selectable devices may include a mobile phone, a portable digital assistant (PDA), a personal computer, a set-top box, or any combination thereof.

Figure 12:
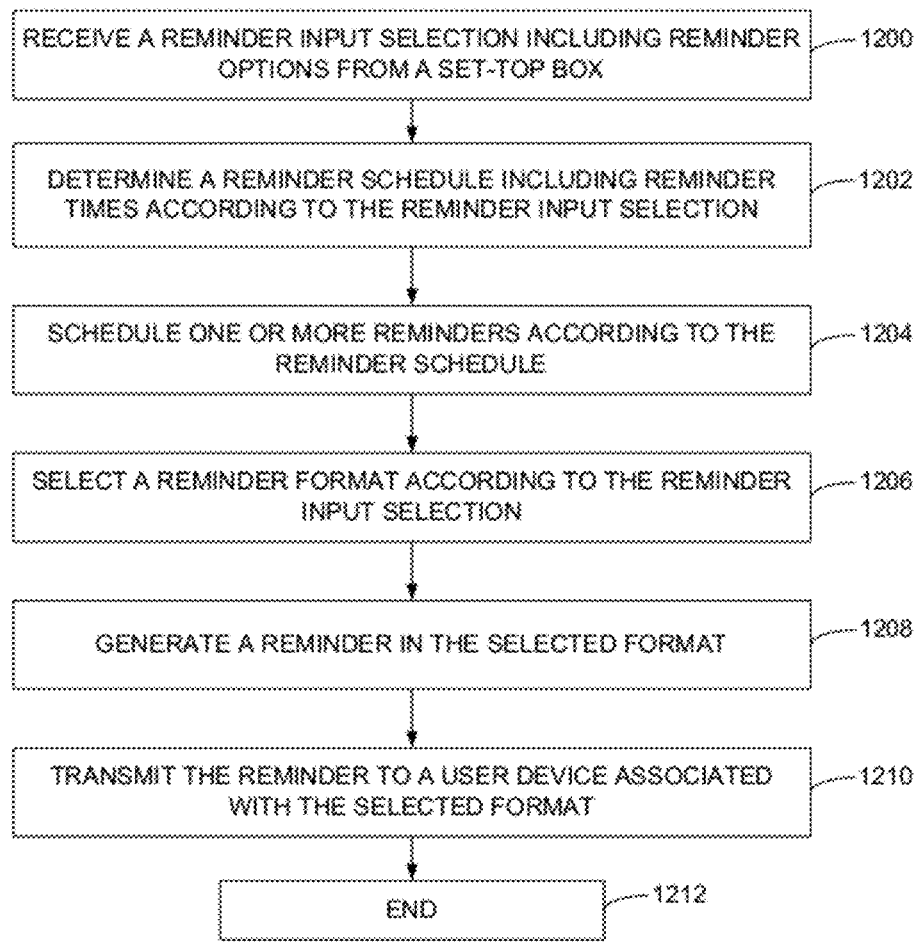
FIG. 12 is a flow diagram of a third particular illustrative embodiment of a method of scheduling an event, such as a reminder, related to an advertisement.

FIG. 12 is a flow diagram of a particular illustrative embodiment of a method of transmitting a reminder to a user in a selected format. A reminder input selection including reminder options is received from a set-top box, at 1200. A reminder schedule including reminder times is determined according to the reminder input selection, at 1202. One or more reminders are scheduled according to the reminder schedule, at 1204. A reminder format is selected according to the reminder input selection, at 1206. A reminder is generated in the selected format, at 1208. The reminder is transmitted to a user device associated with the selected format, at 1210. The method terminates, at 1212.

Figure 13:
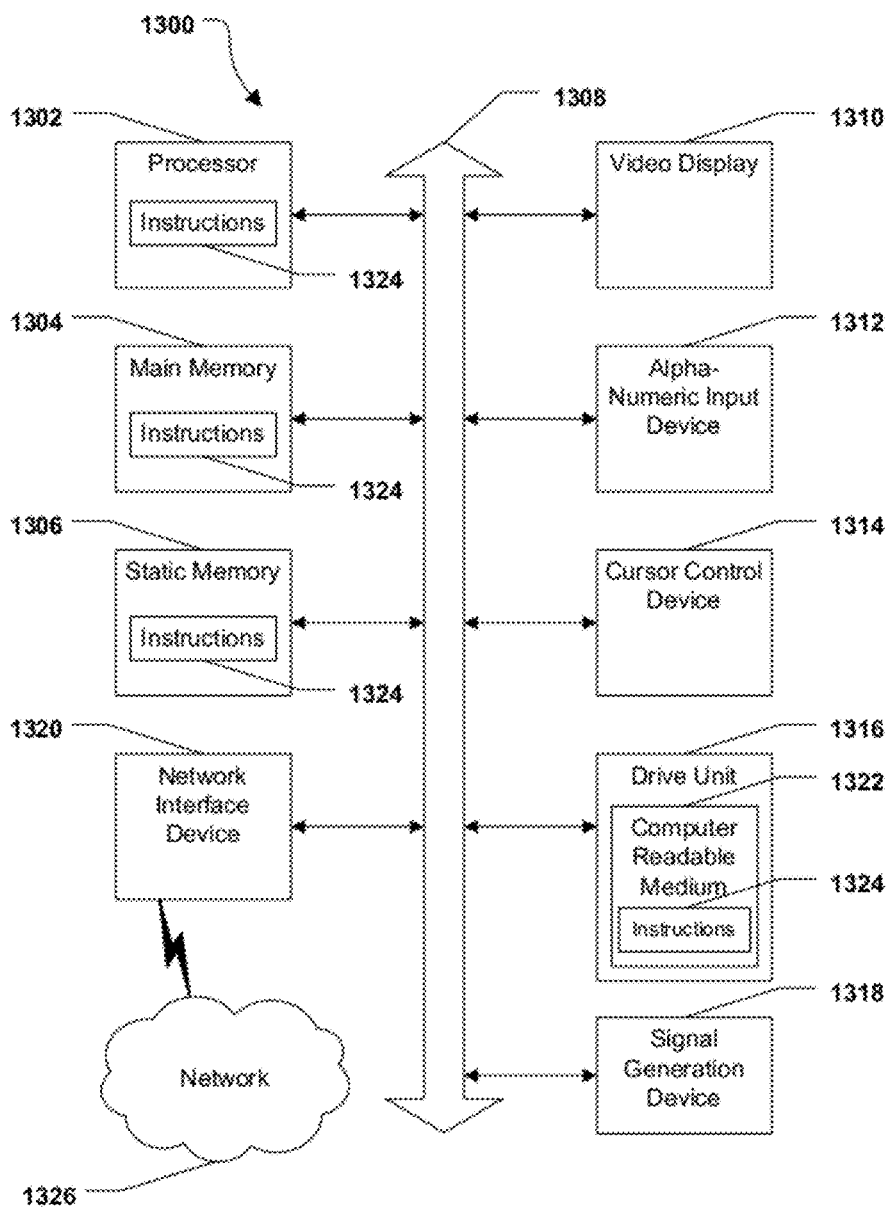
FIG. 13 is a block diagram that is representative of a particular embodiment of a general computer system.

Referring to FIG. 13, an illustrative embodiment of a general computer system is shown and is designated 1300. The computer system 1300 can include a set of instructions that can be executed to cause the computer system 1300 to perform any one or more of the methods or computer based functions disclosed herein. The computer system 1300, or any portion thereof, may operate as a standalone device or may be connected, e.g., using a network, to other computer systems or peripheral devices, including a server or set-top box device, as shown in FIGS. 1-2.

In a networked deployment, the computer system may operate in the capacity of an IPTV server, such as a video server or application server, or in the capacity of a set-top box device. The computer system 1300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1300 can be implemented using electronic devices that provide voice, video or data communication. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 13, the computer system 1300 may include a processor 1302, e.g., a central processing unit (CPU), a graphics-processing unit (GPU), or both. Moreover, the computer system 1300 can include a main memory 1304 and a static memory 1306 that can communicate with each other via a bus 1308. As shown, the computer system 1300 may further include a video display unit 1310, such as a liquid crystal display (LCD), an organic light emitting diode (OLED), a flat panel display, a solid state display, or a cathode ray tube (CRT). Additionally, the computer system 1300 may include an input device 1312, such as a keyboard, and a cursor control device 1314, such as a mouse. The computer system 1300 can also include a disk drive unit 1316, a signal generation device 1318, such as a speaker or remote control, and a network interface device 1320.

In a particular embodiment, as depicted in FIG. 13, the disk drive unit 1316 may include a computer-readable medium 1322 in which one or more sets of instructions 1324, e.g. software, can be embedded. Further, the instructions 1324 may embody one or more of the methods or logic as described herein. In a particular embodiment, the instructions 1324 may reside completely, or at least partially, within the main memory 1304, the static memory 1306, and/or within the processor 1302 during execution by the computer system 1300. The main memory 1304 and the processor 1302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1324 so that a device connected to a network 1326 can communicate voice, video or data over the network 1326. Further, the instructions 1324 may be transmitted or received over the network 1326 via the network interface device 1320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. Accordingly, the disclosure is considered to include a tangible storage medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
    transmitting media content to a set-top box, the media content including an advertisement, the advertisement including a selectable reminder indicator related to an event;
    receiving an input selection related to the selectable reminder indicator from the set-top box;
    sending a first menu to the set-top box, the first menu including at least one option to schedule a reminder associated with the event; and
    sending a second menu to the set-top box in response to receiving a selection of the at least one option, wherein the second menu includes a device menu, wherein the device menu includes an option to specify a device order in which to send the reminder to a plurality of devices and an option to select a data format associated with each of the plurality of devices, and wherein the option to specify the device order includes an option to select one or more times at which to send the reminder to each of the plurality of devices.

2. The method of claim 1, further comprising:
    receiving a second input selection related to the device order, and
    sending the reminder for the event to the plurality of devices based on the device order.

3. The method of claim 1, further comprising:
    receiving a second input selection related to the selectable reminder indicator from the set-top box to record the event;
    recording the event at a network digital video recorder; and
    downloading the recorded event to the set-top box.

4. The method of claim 3, wherein the event is a television program.

5. The method of claim 1, wherein the advertisement comprises a commercial related to an upcoming scheduled television program and wherein the selectable reminder indicator includes an option to record the upcoming scheduled television program.

6. The method of claim 1, wherein the advertisement comprises a commercial related to a community event and wherein the reminder includes a location of the community event.

7. The method of claim 1, wherein the event is promoted by an advertiser and wherein the first menu includes a second option to a schedule a notification to be sent in response to the advertiser promoting another event.

8. The method of claim 1, further comprising:
    receiving a second input selection related to the selectable reminder indicator from the set-top box to record the event; and
    sending a third menu to the set-top box including a second option to record the event and a third option to record the event on a recurring basis.

9. The method of claim 8, wherein the third menu includes a fourth option to record the event each time the event is shown.

10. The method of claim 1, wherein the data format corresponds to an email message, a text message, an audio announcement or a pop-up visual indicator.

11. The method of claim 1, wherein the set-top box is coupled to a display device and wherein the media content includes data to trigger display of the selectable reminder indicator at the display device.

12. The method of claim 1, wherein the set-top box is coupled to a display device and wherein display of the selectable reminder indicator at the display device is triggered at a particular time after the advertisement is provided to the display device.

13. The method of claim 1, further comprising sending an option menu to the set-top box in response to receiving a second input selection to schedule a future action.

14. The method of claim 13, further comprising:
sending the second input selection to a content source; and
receiving the option menu from the content source.

15. A system, comprising:
a processor; and
a memory coupled to the processor, wherein the memory includes:
 a record module executable by the processor to schedule a record operation of a program associated with an advertisement via a network digital video recorder when an input selection of a selectable reminder indicator associated with an event comprises a record input;
 a device module executable by the processor to enable selection of a plurality of communication devices to receive a reminder associated with the event, to specify one or more times at which to receive the reminder at each of the plurality of communication devices, and to select a data format associated with the each of the plurality of communication devices, wherein the one or more times indicate a device order of the plurality of communication devices; and
 a reminder module executable by the processor to schedule transmission of the reminder to a first communication device of the plurality of communication devices based on the device order at the one or more times when the input selection comprises a reminder input.

16. The system of claim 15, further comprising a text-to-speech converter module executable by the processor to generate an audio reminder for transmission to the first communication device.

17. The system of claim 15, further comprising a reminder generator executable by the processor to generate the reminder in one or more formats for transmission to the first communication device and to at least one other communication device.

18. The system of claim 15, wherein the advertisement comprises a commercial related to an upcoming event, and wherein the reminder is related to the upcoming event.

19. The system of claim 15, further comprising a search engine executable by the processor, wherein results from the search engine enable the record module to record segments of the program that are related to particular subject matter.

20. A computer-readable storage device storing instructions that, when executed by a processor, cause the processor to perform operations comprising:
 transmitting media content to a set-top box, the media content including an advertisement having a selectable reminder indicator related to an event;
 receiving an input selection related to the selectable reminder indicator;
 receiving first data identifying a plurality of devices;
 receiving one or more times at which to transmit to each of the plurality of devices, wherein the one or more times indicate a device order of transmitting to the plurality of devices;
 receiving a data format associated with the each of the plurality of devices; and
 scheduling a first reminder related to the event for transmission to a first device of the plurality of devices at a first time of the one or more times and scheduling a second reminder related to the event for transmission to a second device of the plurality of devices at a second time of the one or more times, wherein the first device and the second device are selected based on the device order.

* * * * *